United States Patent
Minegishi et al.

[11] Patent Number: 6,155,950
[45] Date of Patent: Dec. 5, 2000

[54] INNER ROLLER AND OUTER ROLLER IN INTERNAL-MESHING PLANETARY GEAR CONSTRUCTION, AND METHODS OF FABRICATING THEM

[75] Inventors: Kiyoji Minegishi, Aichi; Masanori Egawa, Chiryu; Hiroki Yamazaki, Ohbu, all of Japan

[73] Assignee: Sumitomo Heavy Industries, Ltd., Tokyo, Japan

[21] Appl. No.: 09/280,716

[22] Filed: Mar. 30, 1999

Related U.S. Application Data

[62] Division of application No. 08/872,386, Jun. 10, 1997.

[30] Foreign Application Priority Data

Jun. 11, 1996 [JP] Japan ................... 8-148838

[51] Int. Cl.[7] .................................... F16H 1/32
[52] U.S. Cl. ................................ 475/178
[58] Field of Search ............................ 475/178

[56] References Cited

U.S. PATENT DOCUMENTS

| | | | |
|---|---|---|---|
| 3,795,957 | 3/1974 | Steusloff | 29/90.01 |
| 3,816,892 | 6/1974 | Karmann et al. | 29/90.01 |
| 3,927,449 | 12/1975 | Gibble et al. | 29/895.33 |
| 5,148,966 | 9/1992 | Minase et al. | 29/895.3 |
| 5,522,124 | 6/1996 | Depperman | 29/90.01 |
| 5,992,020 | 11/1999 | Minegishi et al. | 29/895.33 |

*Primary Examiner*—Dirk Wright
*Attorney, Agent, or Firm*—Arent Fox Kintner Plotkin & Kahn, PLLC

[57] ABSTRACT

An inner roller 30 (in FIG. 2) for use in an internal-meshing planetary gear construction has its inner-peripheral wall 32 formed into a shape which is brought closer to a regular polygon of $\underline{n}$ sides (where $\underline{n}$ denotes an integer of at least 3, and n=3 holds in the illustrated example). Lubricating oil is reserved in clearances H1 defined near the vertices of the regular triangle, and an inner pin 7 is retained in light touch with the three middle points P1–P3 of the respective sides of the regular triangle. Thus, the reservation of the lubricating oil and the retention of the inner pin 7 free from backlash are made consistent, thereby to relieve the backlash of the planetary gear construction and to enhance the durability thereof. The shape of the inner-peripheral wall 32 closer to the regular polygon of $\underline{n}$ 7 is obtained in such a way that the inner-peripheral wall 32 is subjected to a burnishing work in the state in which depressive forces (deforming forces) based on chucking jigs are applied to the circumferential equidistant positions of the cylindrical blank of the inner roller 30, and that strains (residual strains) remaining after the burnishing work are further enlarged by a heat treatment.

4 Claims, 8 Drawing Sheets

INNER ROLLER AND OUTER ROLLER IN INTERNAL-MESHING PLANETARY GEAR CONSTRUCTION, AND METHODS OF FABRICATING THEM

CROSS REFERENCE TO RELATED APPLICATIONS

This application is a divisional of U.S. patent application Ser. No. 08/872,386, filed Jun. 10, 1997. The subject matter of Application Ser. No. 08/872,386 is hereby incorporated by reference.

BACKGROUND OF THE INVENTION

1. Field of the Invention

The present invention relates to an inner roller or an outer roller in an internal-meshing planetary gear construction, and a method of fabricating the inner or outer roller.

2. Description of the Prior Art

There has heretofore been extensively known an internal-meshing planetary gear construction having a first shaft, eccentric elements which are rotated by the rotation of the first shaft, external gears which are assembled so as to be respectively rotatable eccentrically to the first shaft through the corresponding eccentric elements, an internal gear with which the external gears are "in internal mesh" (that is, with which the external gears mesh internally of this internal gear), and a second shaft which is connected to the external gears through device for transmitting only the rotational components of the external gears on the axes thereof.

An example of the construction in the prior art is illustrated in FIGS. 6 and 7. The prior-art example is such that the construction is applied to "reduction gears" by employing the first shaft as an input shaft and the second shaft as an output shaft and by fixing the internal gear.

Eccentric elements of eccentricity $e$ 3a, 3b are snugly fitted on the input shaft 1 with a predetermined phase difference (180° in this example) set therebetween. The eccentric elements 3a and 3b are integral in this example. Two external gears 5a, 5b are mounted on the respective eccentric elements 3a, 3b through corresponding bearings 4a, 4b. Each of the external gears 5a and 5b is formed with a plurality of inner roller holes 6 (6a and 6b), in each of which an inner pin 7 and an inner roller 8 are inserted.

The inner pin 7 is enclosed or concealed with the inner roller 8 for the purpose of dispersing slips during the operation of the planetary gear construction, that is, the slips between the inner pins 7 and the external gears 5a, 5b are dispersed into the slips between the inner pins 7 and the inner rollers 8, and the slips between the inner rollers 8 and the external gears 5a, 5b.

The inner pins 7 and inner rollers 8 which penetrate through the external gears 5a, 5b are secured or fitted in the flange portion of the output shaft 2.

The 2 (two) external gears 5a, 5b (in a double-row structure) are chiefly intended to enlarge a transmission capacity, to maintain a strength and to hold a dynamic rotational balance.

External teeth 9 of trochoidal tooth profile, circular-arc tooth profile, or the like are provided at the outer periphery of each of the external gears 5a, 5b. The external teeth 9 are in internal mesh with the internal gear 10 fixed to a casing 12.

The internal teeth of the internal gear 10 are concretely constructed of outer pins 11. The outer pins 11 are loosely fitted in outer pin holes 13, and are held easy of rotation. Each of the outer pins 11 is sometimes enclosed with an outer roller 14 as shown in FIG. 8 by way of example. Thus, slips during the operation can be dispersed (that is, the slips between the outer pins 11 and the outer pin holes 13 in FIG. 7 can be dispersed into the slips between the outer pins 11A and the outer rollers 14, and the slips between the outer rollers 14 and the outer pin holes 13 as understood from FIG. 8).

The operation of the exemplified reduction gears will be briefly explained. When the input shaft 1 is rotated one revolution, the eccentric elements 3a, 3b is also rotated one revolution. When the eccentric elements 3a, 3b perform one revolution, the respective external gears 5a, 5b are about to rock (or swing) and rotate around the input shaft 1. Since, however, the rotations of the external gears 5a, 5b on the axes thereof are restrained by the internal gear 10, the external gears 5a, 5b perform almost only the rocking in internal mesh with the internal gear 10.

Now, supposing by way of example a case where the number of teeth of each of the external gears 5a and 5b is N and where the number of teeth of the internal gear 10 is (N+1), the difference between the numbers of teeth is 1 (one). Consequently, each time the input shaft 1 is rotated one revolution, the external gears 5a and 5b shift (or rotate on their own axes) to the amount of one tooth relative to the internal gear 10 fixed to the casing 12. This signifies that speed of one rotation of input shaft 1 is reduced to speed of −1/N rotation of the external gears 5a, 5b. Here, the minus sign indicates the reverse rotation (or the revolution in the reverse direction).

The rotations of the external gears 5a, 5b have the rocking components thereof absorbed by clearances defined between the inner roller holes 6 and the inner rollers 8, and only the rotational components thereof on their own axes are transmitted to the output shaft 2 through the inner pins 7 inserted in the inner rollers 8. As a result, speed reduction at a reduction ratio of −N is eventually accomplished.

By way of example, accordingly, a geared motor of great reduction ratio can be obtained with only one stage of reduction mechanism by combining the reduction gears of the internal-meshing planetary gear construction with an electric motor.

In the prior-art example, the internal gear of the internal-meshing planetary gear construction is fixed, and the first shaft and second shaft are respectively employed as the input shaft and output shaft. However, reduction gears can also be constructed by fixing the second shaft, employing the first shaft as an input shaft and employing the internal gear as an output shaft. Further, speedup gears can also be constructed by inverting the input/output relations of each of such reduction gears.

Besides, in the prior-art example, the eccentric elements are directly mounted on the outer periphery of the first shaft. In this regard, there has also been known a construction of the type wherein the first shaft is dispersed or divided into "three first shafts" through spur gears, eccentric elements are respectively mounted on the dispersed first shafts, and the external gears are rockingly rotated through the eccentric elements. The present invention is applicable even to the internal-meshing planetary gear construction of such a type without any problem.

Meanwhile, as exaggeratedly shown in FIG. 9, a clearance δ1 is defined between the outer periphery of the inner pin 7 and the inner periphery of the inner roller 8. Besides, as exaggeratedly shown in FIG. 10, a clearance δ2 is defined between the outer periphery of the outer pin 11A and the inner periphery of the outer roller 14. Each of the clearances δ1 and δ2 serves to ensure the formation of a lubricating oil film between the two members, and to allow the smooth slip between the members touching with each other.

However, when such a clearance δ1 or δ2 is defined, the problem arises that backlash develops between the inner pin 7 and the inner roller 8 or between the outer pin 11A and the outer roller 14, with the result that the whole gear transmission mechanism undergoes backlash. This incurs the disadvantage that, when the rotation on one side is to be transferred to the rotation on the other side, the rotation on the driving side does not immediately appear as the rotation on the driven side. Hereinbelow, such a delay in response shall be termed "angular backlash".

In a case where the internal-meshing planetary gear construction is used as the control mechanism of, for example, a servomotor, the angular backlash degrades the control precision thereof. Various causes are considered for the occurrence of the angular backlash in the internal-meshing planetary gear construction. As contrivances for eliminating such angular backlash, there have hitherto been known various structures, for example, one wherein the external gears, the internal gear, etc. are bisected for forward rotation and for reverse rotation, and one wherein the roles of the external gears, the internal gear, etc. are allotted to the forward rotation and to the reverse rotation (refer to Japanese Patent Applications Laid-open No. 106744/1984, No. 113340/1984, No. 115743/1984, No. 208366/1984, and so forth).

In addition, the inventors have ever proposed an expedient in Japanese Patent Application No. 86571/1985 (corresponding to Japanese Patent Application Publication No. 86506/1993) as a method of minimizing a clearance relevant to an outer pin and an outer pin hole (in an internal-meshing planetary gear construction of the type which has no outer roller).

In any of the known examples, however, note has never been taken of the clearance δ1 between the inner pin and the inner roller or the clearance δ2 between the outer pin and the outer roller for the purpose of relieving the angular backlash. It has been the actual circumstances that quite no measure is taken to counter the angular backlash developing in the clearance δ1 or δ2.

The reason therefor is that the clearance δ1 or δ2 has been considered unremovable (as an indispensable constituent) because of the following requisites: ① Predetermined lubricating oil needs to be always reserved between the inner pin and the inner roller or between the outer pin and the outer roller. ② Even at the appearance of the state in which the axes of the inner pin and the inner roller or those of the outer pin and the outer roller have deviated due to a machining error, an assemblage error, or the deformation of the two members during the transmission of power, both the members need to be slipped smoothly.

Incidentally, the use of a material of low friction and good affinity, for example, white metal or fluorocarbon resin is also considered as a method which ensures the favorable slides of the two slide members without defining the clearance. In general, however, a great torque with the torque of the input shaft amplified several times to 100 or more times, acts on the inner roller or outer roller of the internal-meshing planetary gear construction. Therefore, a material of high hardness and high strength must be used from the viewpoint of durability, and the above method cannot be adopted in many cases.

Further, in this regard, the material of high hardness and high strength needs to be wrought at a high precision, so that the inside and outside diameters of the inner roller or the outer roller must be finished by "grinding". Especially in case of finishing the inside diameter by the grinding, a finish roughness is limited (to 2–3 [µm] as an economical value) for the reason that the grinding is, to the last, a work for shearing the crystal grains of the material. This has led to the requisite that the existence of the clearance δ1 or δ2 having a certain magnitude is indispensable for keeping an oil film under the condition of the roughness.

For the reasons thus far explained, the clearance δ1 between the inner pin and the inner roller or the clearance δ2 between the outer pin and the outer roller has hitherto been thought indispensable. Accordingly, the occurrence of the angular backlash ascribable to the clearance has been thought inevitable.

SUMMARY OF THE INVENTION

The present invention has been made in view of the problems of the prior art as stated above, and has for its object to provide an inner roller or an outer roller in an internal-meshing planetary gear construction in which angular backlash can be rendered much less than in the prior art without posing any new drawback, by reconsidering on the basis of a different conception the shape of the cross section of the inner periphery of the inner roller or outer roller, as has hitherto been thought to (naturally) require a work into a shape closest to a true circle to the utmost (namely, a work at the highest possible degree of circularity).

Another object of the present invention is to provide a method which is the most suitable for actually fabricating the inner roller or outer roller.

The objects are achieved by structures defined in Claims 1 and 2, as regards the inner roller in the internal-meshing planetary gear construction. Quite similar structures defined in Claims 3 and 4 are applied to the outer roller.

The cross section of the inner-peripheral wall of the inner roller or outer roller according to the present invention has a shape which is brought closer to a "regular polygon of n sides" unlike a true circle (more exactly, the closest possible true circle) in the prior art.

Here, letter n denotes an integer of at least 3. In the concrete, accordingly, the concept of the "regular polygon of n sides" shall cover a regular triangle, a regular tetragon, a regular pentagon, a regular hexagon, . . . .

Furthermore, as described later, in the present invention, from the same viewpoint, a rhombus (practically ellipse) may well be adopted.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENTS

Now, the aspects of performance of the present invention will be described in detail with reference to the drawings.

The present invention is pertinent only to an inner roller or outer roller for use in an internal-meshing planetary gear construction, and the structure of the whole internal-meshing planetary gear construction toward which the present invention is directed is not especially different from the prior-art structure. Accordingly, the structure of the whole internal-meshing planetary gear construction shall be omitted from description because it has already been detailed.

Figure 1:
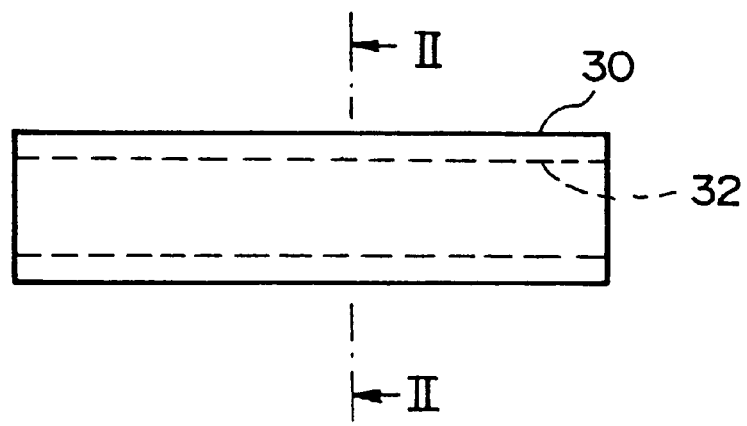
FIG. 1 is a front view of an inner roller which is applied to an internal-meshing planetary gear construction according to the present invention.
Figure 2:
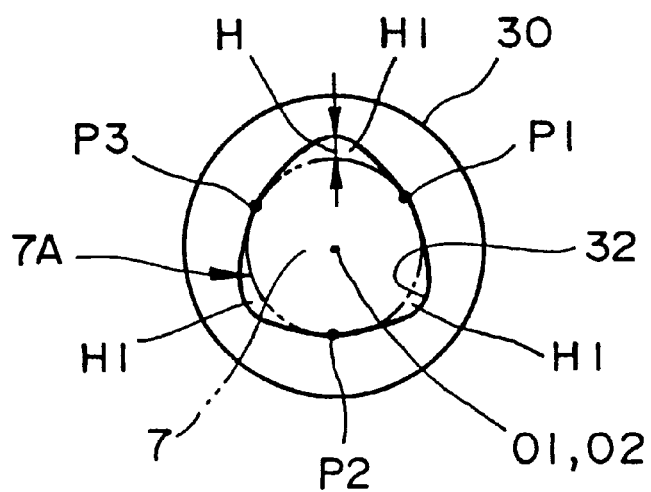
FIG. 2 is an enlarged sectional view taken along line II—II in FIG. 1.

FIG. 1 is a front view of an inner roller 30 according to the present invention, while FIG. 2 is a sectional view taken along line II—II in FIG. 1.

The inner roller 30 is formed into the shape in which the cross section of the inner-peripheral wall 32 of the cylinder of this inner roller is brought closer to a regular triangle from the true circle.

In FIG. 2, a circle depicted by a two-dot chain line indicates the outer periphery of an inner pin 7 corresponding to the inner roller 30. As seen from the figure, the outer periphery 7A of the inner pin 7 is formed into the true circle as in the prior art. This outer periphery 7A of the inner pin 7 lie in light touch with the middle parts P1–P3 of the respective sides of the regular triangle. The clearance H between each of the vertex parts of the regular triangle and the outer periphery 7A of the inner pin 7 is concretely set at 5–20 [$\mu$m], preferably 10 [$\mu$m] or so, in a case where the outside diameter of the inner pin 7 is on the order of 17 [mm] by way of example.

Owing to the inner-peripheral wall 32 of the inner pin 30 endowed with such a shape, spaces H1 shown in FIG. 2 function as vacancies in which lubricating oil is reserved. Besides, since the inner pin 7 lies in touch with the inner roller 30 at the middle parts P1–P3 of the inner-peripheral wall 32 of this inner roller, the axis O1 of the inner roller 30 and that O2 of the inner pin 7 do not deviate unless an especially great force acts on the member 30 or 7. Accordingly, "backlash" does not develop as a rule. Therefore, the "angular backlash" ascribable to the clearance δ1 as in the prior art does not develop, either.

Further, even if a machining error, a) an assemblage error or the like has been involved, b) the member 30 or 7 has been elastically deformed during the transmission of power, or c) the respective axes O1 and O2 of the inner roller 30 and inner pin 7 have deviated due to an unexpected great external load, such conditions can be flexibly coped with by some shifts of the touch positions of the inner roller 30 and inner pin 7 because these members 30 and 7 lie in touch slightly at only the three points of the middle parts P1–P3. That is, even when such circumstances have occurred, the inner roller 30 and inner pin 7 can keep a smooth slip.

Owing to the adoption of the inner roller (or outer roller) of the structure described above, accordingly, the angular backlash can be relieved in such a way that the inner roller (outer roller) and inner pin (outer pin) are reliably kept coaxial with the lubricating oil reserved in a large quantity, that is, without degrading the durability of both the associated members. Furthermore, the favorable slip characteristics can be ensured even in the presence of the machining error, the elastic deformation during the operation of the planetary gear construction, the elastic deformation ascribable to the external load, or the like, so that increase in a power loss is not incurred.

Next, a method of fabricating the inner roller or outer roller in such a shape will be concretely described.

Figure 3:
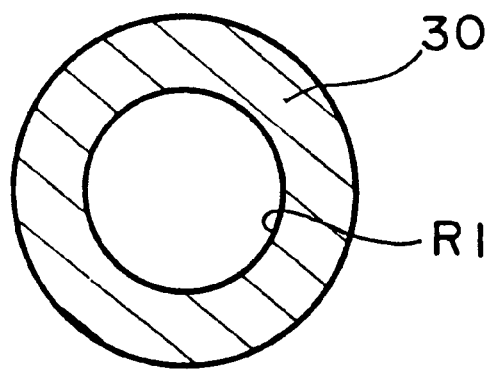
FIG. 3 is a flow sheet showing an example of a method of fabricating an inner roller the inner-peripheral wall of which is brought closer to a regular polygon of n sides.
Figure 3:
Figure 3:
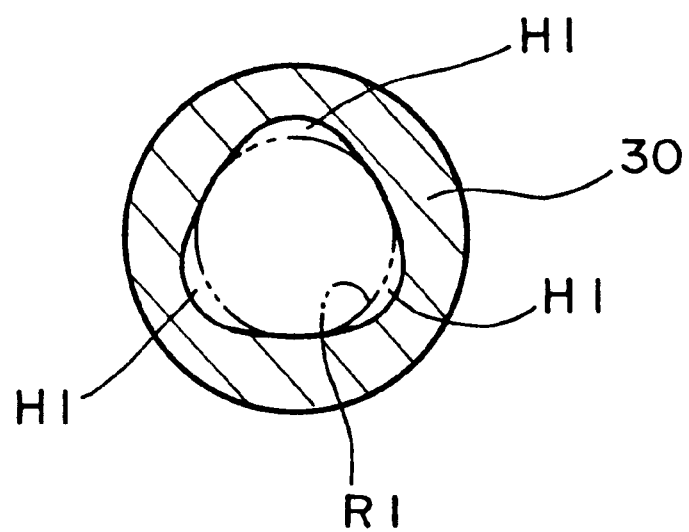

In forming the inner-peripheral wall into the shape which is closer to the regular polygon of $\underline{n}$ sides, it is impossible to adopt the (true-circle work) method of cutting or grinding as in the prior art. Besides, a method illustrated in FIG. 3 by way of example is conceptually considered. In this method, a circle R1 to be inscribed to the regular polygon of $\underline{n}$ sides is first formed by cutting, and the spaces H1 extending along the axis of the inner roller 30 are subsequently formed by cutting. It is next to impossible, however, to actually form the shape closer to the regular polygon of $\underline{n}$ sides with accuracy by the use of this method.

The inventors have therefore originated a method in which a burnishing work attended with chucking strains and a heat treatment attended with thermal strains are combined so as to positively utilize the working strains and the thermal strains.

FIGS. 4A–4E illustrate steps for fabricating the inner roller (or outer roller). Incidentally, the contraction scales of these figures are not the same because preference is taken of clear illustration.

Figure 4A:
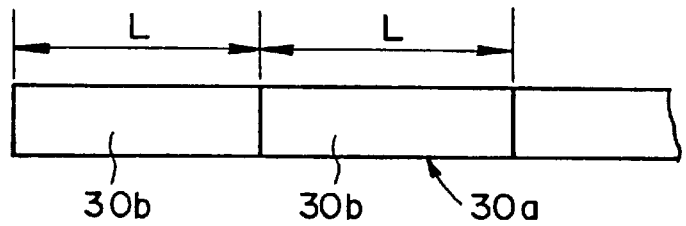
FIGS. 4A–4E are flow diagrams for explaining the aspect of performance of a method of fabricating an inner roller according to the present invention.

As shown in FIG. 4A, an inner-roller blank 30a being elongate is severed at predetermined lengths L into inner-roller blanks 30b.

Figure 4B:
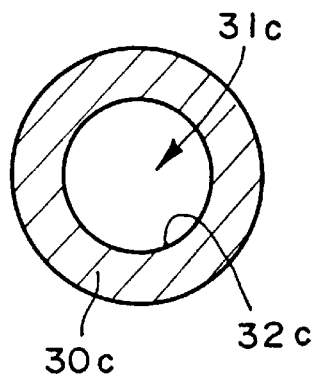

Subsequently, as shown by an enlarged cross section in FIG. 4B, the central part of the inner-roller blank 30b is cut away by any suitable method, for example, boring, reaming or turning. Then, an inner-roller blank 30c in the shape of a cylinder is roughly formed.

The above steps explained are similar to the steps in the prior art. In the prior art, a finishing process for the inner-peripheral wall 32c of the inner-roller blank 30c is thereafter initiated to lathe with a turning. In contrast, according to the present invention, the finishing process is not performed, but the inner-peripheral wall 32c is subsequently made a mirror-finished surface by a burnishing work.

The "burnishing work" is a working method in which a metal surface having ruggedness is press-rolled (or crushed) by a burnishing roller so as to be finished into a smooth surface like a mirror, and which is known in itself. The burnishing work is a kind of plastic deformation work, and it differs from a work such as cutting in which the crystal grains of metal are shaved off by shearing. It is therefore possible to obtain the inner-peripheral wall which is very smooth in point of surface roughness.

In executing the burnishing work, the inner-roller blank 30c is fixed by any expedient, and the burnishing roller not shown is inserted into the through hole 31c of the blank 30c.

In the present invention, the fixation of the inner-roller blank 30c is positively utilized for forming the regular polygon of n sides.

Figure 4C:
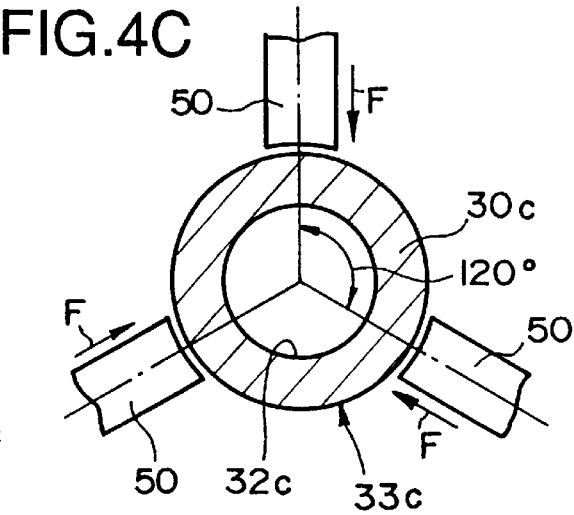

More concretely, the burnishing work proceeds as explained below. First, as shown in FIG. 4C, the outer periphery 33c of the inner-roller blank 30c is chucked at the circumferential equidistant positions of this blank 30c (at the positions of this blank 30c at regular angular intervals of 120° in an exemplary case where the cross section of the inner-peripheral wall of an inner roller is brought closer to the shape of a regular triangle) by chucking jigs 50 so as to generate depressive forces F of predetermined magnitude directed radially inward of this blank 30c. Thereafter, the inner-peripheral wall 32c is subjected to the burnishing work (true-circle work) in the state in which the depressive chucking is done (that is, in the state in which the inner-roller blank 30c is deformed radially inward at the circumferential equidistant positions by the chucking).

Figure 4D:
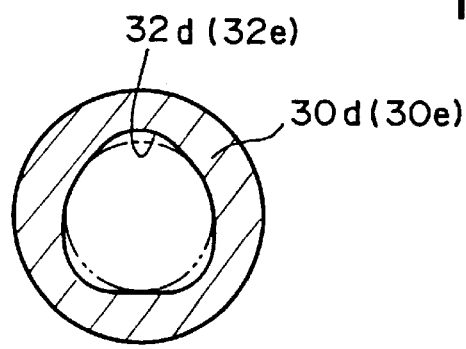

The depressive chucking is released after the burnishing work. Then, as shown in FIG. 4D, an inner-roller blank 30d formed with an inner-peripheral wall 32d deformed inversely to the depressive deformations is obtained owing to working strains (residual strains). At this stage, the inner-peripheral wall 32d has the shape which is closer to the regular triangle, and the surface thereof is a mirror-finished surface which is very smooth.

In this aspect of performance, the inner-roller blank 30d is subsequently heat-treated so as to enlarge the strains still more, thereby to obtain an inner-roller blank 30e having an inner-peripheral wall 32e which is brought closer to the shape of the regular triangle more definitely. In a case where the inner roller 30 is fabricated of bearing steel by way of example, the heat treatment may be a known expedient in which quenching is followed by tempering.

Figure 4E:
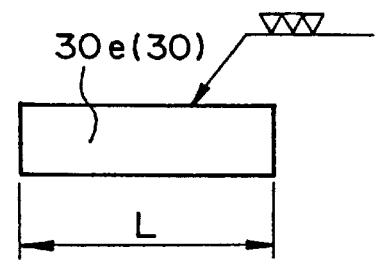

Lastly, as shown in FIG. 4E, the outer periphery of the inner-roller blank 30e is subjected to a finishing work by grinding, similarly to the prior-art method. Then, the inner roller 30 is completed.

Owing to the adoption of the fabricating method thus far explained, the inner-peripheral wall 32 of the inner roller 30 is made the mirror-finished surface by the burnishing work, so that the friction factor of the inner-peripheral wall 32 becomes small enough to expect the smooth slip of the inner roller 30 with respect to the inner pin 7. Moreover, the surface of the inner-peripheral wall 32 is made high in hardness and high in strength by the heat treatment, so that the durability of the inner roller 30 is enhanced.

In addition, although the "regular triangle" has been employed as the "regular polygon of n sides" in the foregoing embodiments, it suffices as the purport of the present invention that the inner pin is permitted to equally touch all the sides of the regular polygon having the n sides. It is accordingly obvious that, as long as the number n is the integer of at least 3, the present invention can be incarnated without being restricted to the regular triangle.

Furthermore, according to above purport of the present invention, in the present invention, a rhombus (namely, practically ellipse) may well be adopted.

Figure 5:
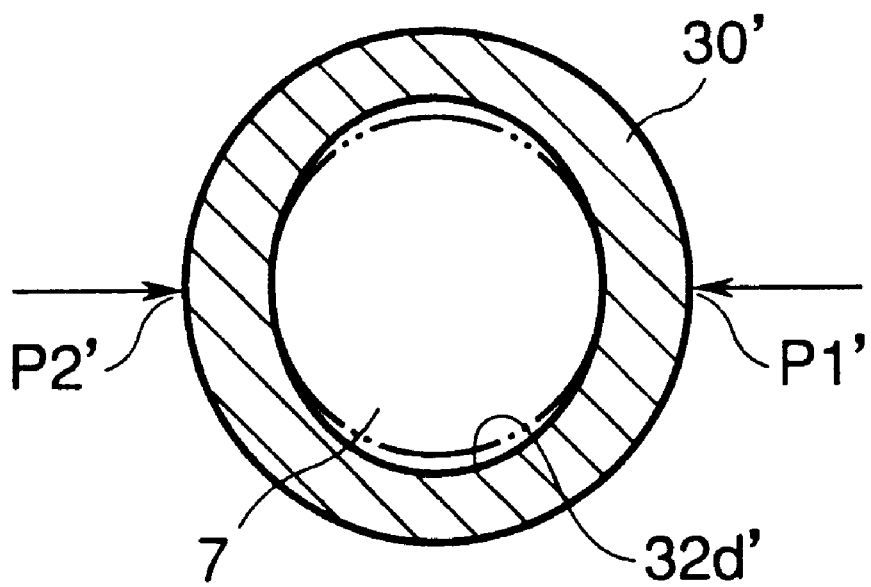
FIG. 5 is an enlarged sectional view corresponding to FIG. 2, for showing another example of inner-roller.
Figure 6:
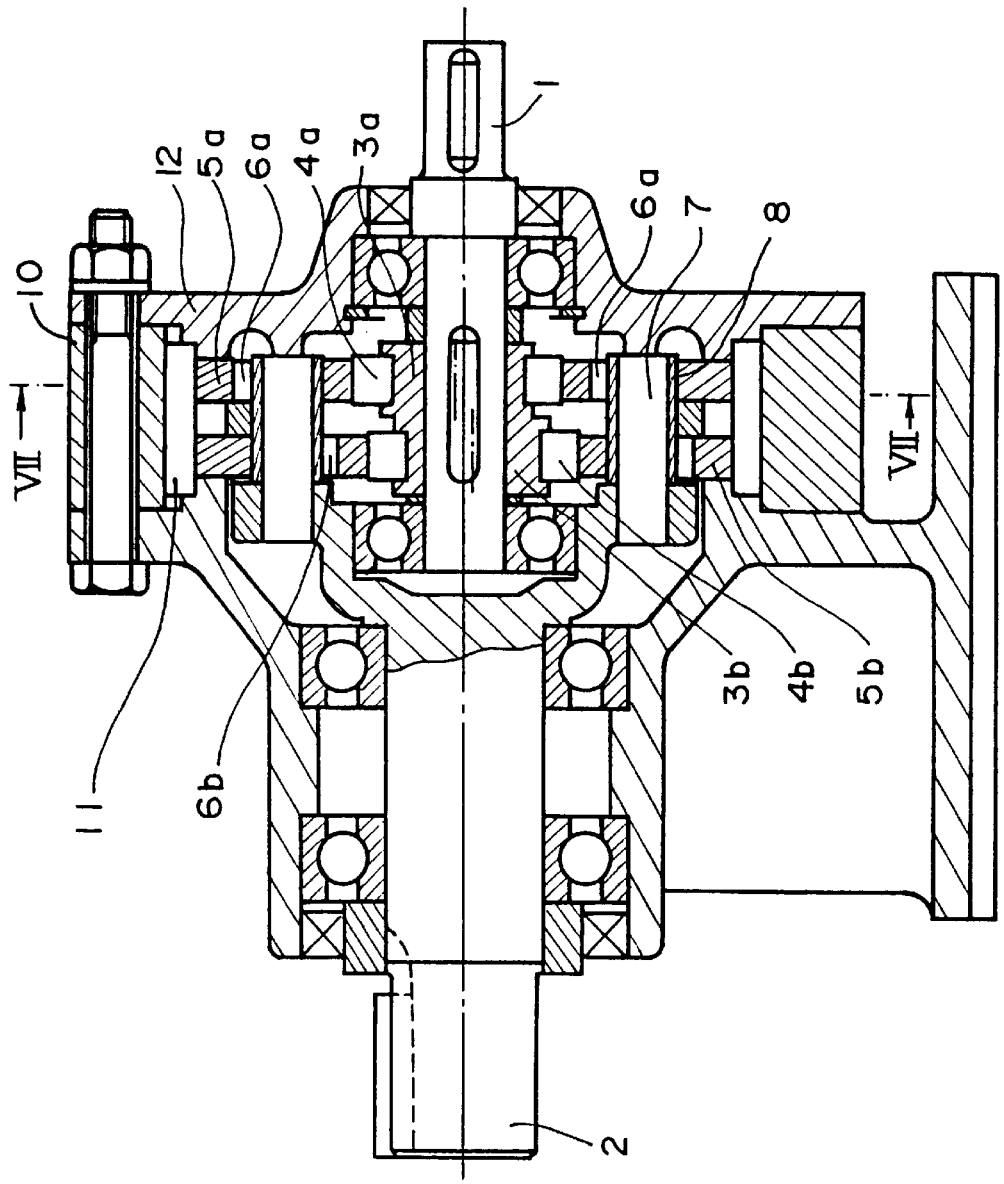
FIG. 6 is a front view, partially broken away, for explaining the structure of an internal-meshing planetary gear construction in the prior art.
Figure 7:
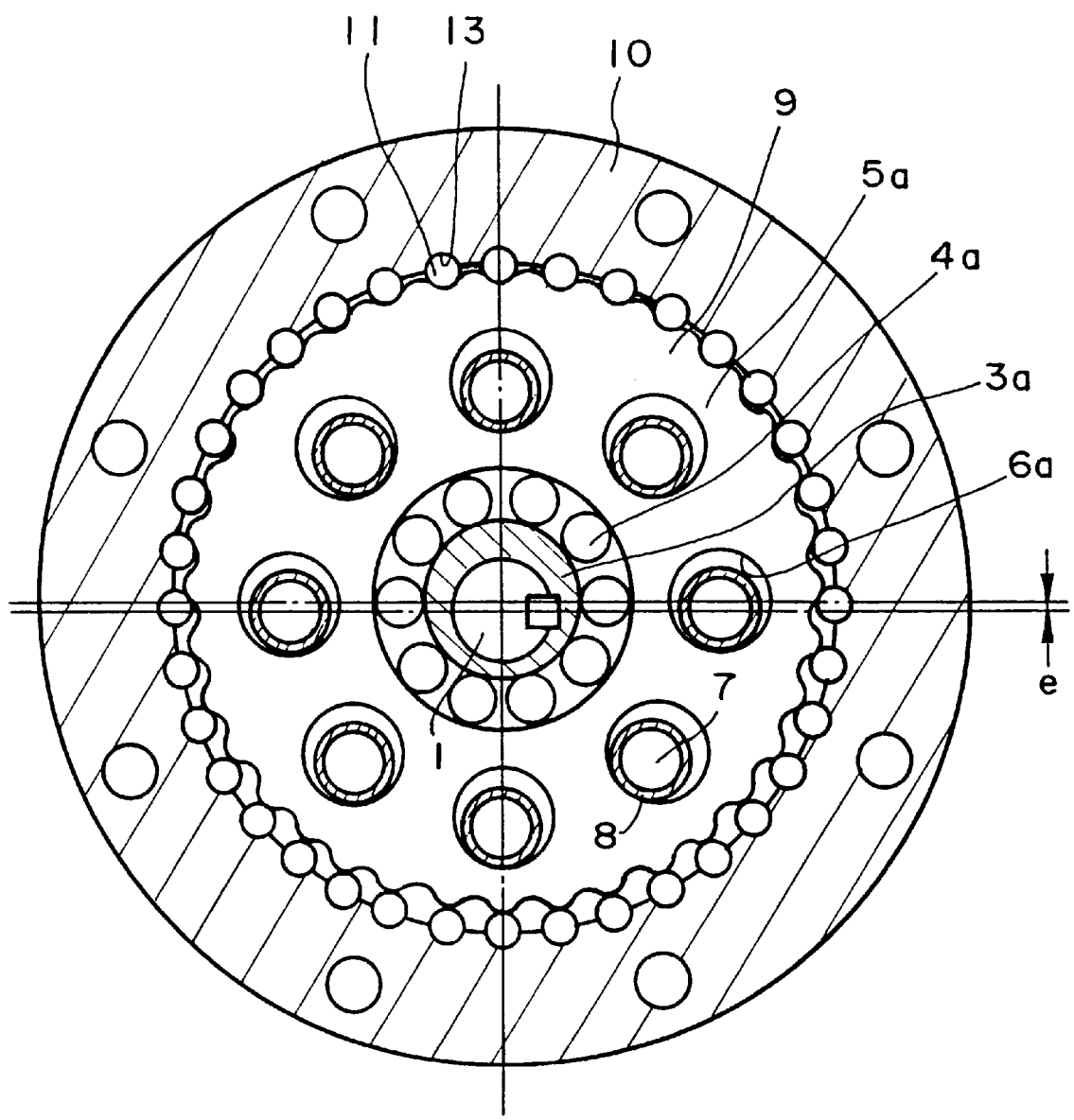
FIG. 7 is a sectional view taken along line VII—VII in FIG. 6.
Figure 8:
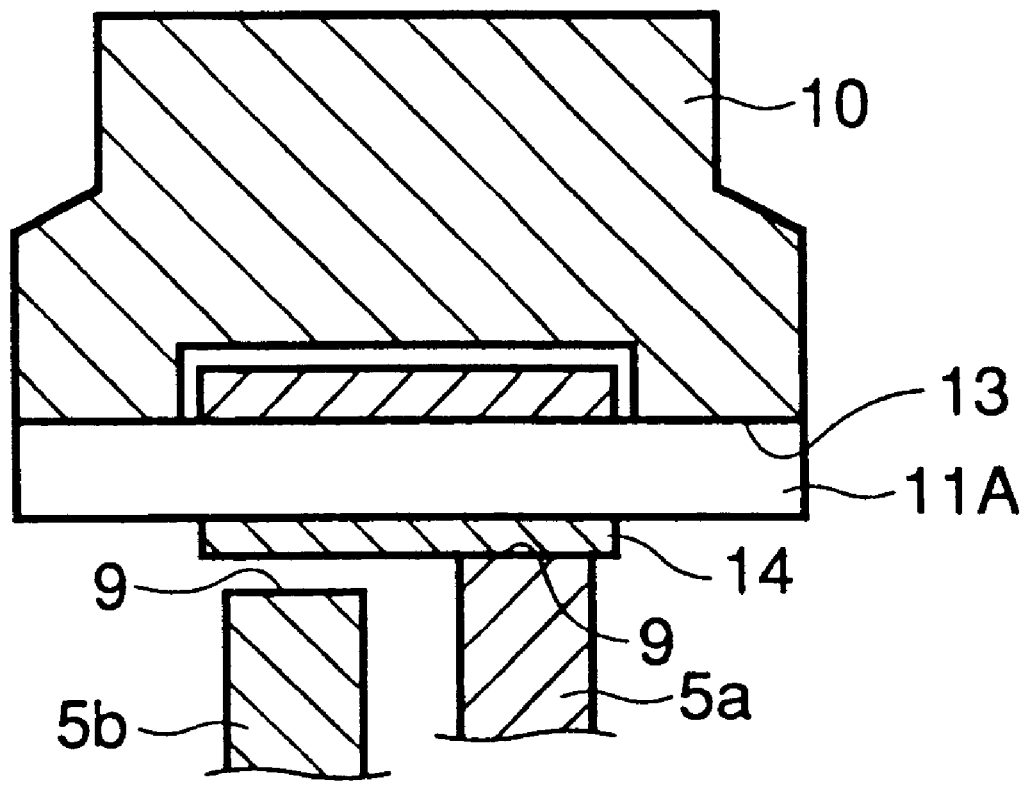
FIG. 8 is a partial enlarged sectional view for explaining the structure of an internal-meshing planetary gear construction which has an outer roller.
Figure 9:
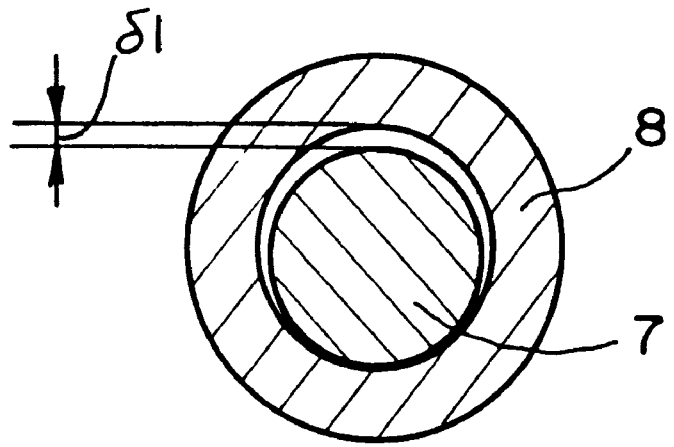
FIG. 9 is an enlarged sectional view corresponding to FIG. 2, for explaining the relationship between an inner roller and an inner pin in the prior art.
Figure 10:
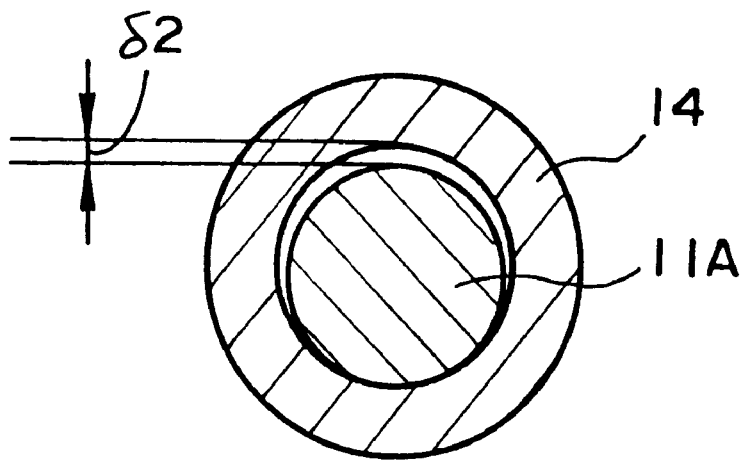
FIG. 10 is an enlarged sectional view corresponding to FIG. 2, for explaining the relationship between the outer roller and an outer pin in the prior art.

As shown in FIG. 5, an inner-roller 30' the inner-peripheral wall 32d' of which is formed in a shape which is brought closer to a rhombus (or ellipse) can be incarnated, for example, by chucking at only opposite 2 (two) circumferential positions P1' and P2'.

Besides, although the structure and fabricating method according to the present invention have been described by taking the inner roller as the example, it is needless to say that the present invention is also applicable to the outer roller quite similarly.

As set forth above, an inner roller (or outer roller) according to the present invention or the inner roller (or outer roller) fabricated by a method according to the present invention has an inner-peripheral wall the cross-sectional shape of which is closer to a regular polygon of n sides, so that lubricating oil can be sufficiently reserved near the vertices of the regular polygon of n sides. Moreover, an inner pin (or outer pin) can be held coaxial with the inner roller (or outer roller) without giving rise to appreciable backlash. Accordingly, the reservation of the lubricating oil (the upkeep of a durability) and the relief of angular backlash can be made consistent.

Further, even when a force causing the axes of the inner pin (or outer pin) and the inner roller (or outer roller) to deviate, has been exerted by an assemblage error, an external load or the like, such a condition can be flexibly coped with because the touch positions of both the mating members may merely shift to some extent. That is, even when such circumstances have occurred, favorable slip characteristics can be kept up yet, and increase in the loss of power is not incurred.

What is claimed is:

1. An inner roller in the shape of a cylinder, for use in an internal-meshing planetary gear construction having a first shaft, an eccentric element which is rotated by rotation of the first shaft, an external gear which is assembled so as to be rotatable eccentrically to the first shaft through the eccentric element, an internal gear with which the external gear is in internal mesh, and a second shaft which is connected to the external gear through means for transmitting only a rotational component of the external gear on an axis thereof, said inner roller being used with an inner pin in the shape of a column in order to constitute said means for transmitting only the rotational component of the external gear on the axis thereof; characterized in that:

said inner roller in said internal-meshing planetary gear construction comprises the fact that a cross section of an inner-peripheral wall of the cylinder is formed in a shape which is brought closer to a regular polygon of n sides from a true circle, n being an integer of at least 3.

2. An inner roller in the shape of a cylinder, for use in an internal-meshing planetary gear construction having a first shaft, an eccentric element which is rotated by rotation of the first shaft, an external gear which is assembled so as to be rotatable eccentrically to the first shaft through the eccentric element, an internal gear with which the external gear is in internal mesh, and a second shaft which is connected to the external gear through means for transmitting only a rotational component of the external gear on an axis thereof, said inner roller being used with an inner pin in the shape of a column in order to constitute said means for transmitting only the rotational component of the external gear on the axis thereof; characterized in that:

said inner roller in said internal-meshing planetary gear construction comprises the fact that a cross section of an inner-peripheral wall of the cylinder is formed in a shape which is brought closer to a rhombus from a true circle.

3. An outer roller in the shape of a cylinder, for use in an internal-meshing planetary gear construction having a first shaft, an eccentric element which is rotated by rotation of the first shaft, an external gear which is assembled so as to be rotatable eccentrically to the first shaft through the eccentric element, an internal gear with which the external gear is in internal mesh, and a second shaft which is connected to the external gear through means for transmitting only a rotational component of the external gear on an axis thereof, said outer roller being used in order to constitute an internal tooth of said internal gear; characterized in that:

said outer roller in said internal-meshing planetary gear construction comprises the fact that a cross section of an inner-peripheral wall of the cylinder is formed in a shape which is brought closer to a regular polygon of $\underline{n}$ sides from a true circle, $\underline{n}$ being an integer of at least 3.

4. An outer roller in the shape of a cylinder, for use in an internal-meshing planetary gear construction having a first shaft, an eccentric element which is rotated by rotation of the first shaft, an external gear which is assembled so as to be rotatable eccentrically to the first shaft through the eccentric element, an internal gear with which the external gear is in internal mesh, and a second shaft which is connected to the external gear through means for transmitting only a rotational component of the external gear on an axis thereof, said outer roller being used in order to constitute an internal tooth of said internal gear; characterized in that:

said outer roller in said internal-meshing planetary gear construction comprises the fact that a cross section of an inner-peripheral wall of the cylinder is formed in a shape which is brought closer to a rhombus a true circle.

* * * * *